United States Patent Office 3,297,745
Patented Jan. 10, 1967

3,297,745
ETHYLENICALLY UNSATURATED DI- AND
TETRA-URETHANE MONOMERS
Frank Fekete, Monroeville, Patrick J. Keenan, Pittsburgh, and William J. Plant, Monroeville, Pa., assignors to H. H. Robertson Company, Pittsburgh, Pa., a corporation of Pennsylvania
No Drawing. Filed Apr. 5, 1962, Ser. No. 185,785
18 Claims. (Cl. 260—471)

This invention relates to polymerizable monomers and their preparation, their use and their copolymeric products.

More particularly this invention relates to polymerizable monomers which contain at least two ethylenically unsaturated carbon-to-carbon bonds and at least two urethane linkages. In general the present monomers are the reaction products of an organic diisocyanate with an ethylenically unsaturated alcohol. The monomers of this invention may be readily homopolymerized or may be copolymerized with suitable ethylenically unsaturated polymerizable monomers such a styrene, vinyl toluene, diallyl phthalate, acrylates, methacrylates, unsaturated polyesters and the like.

The present monomers are prepared by reacting an organic diisocyanate such as toluene diisocyanate $$O=C=N-\underset{CH_3}{\underset{|}{C_6H_3}}-N=C=O$$

with an ethylenically unsaturated alcohol having the empirical formula $$R_2CH=\overset{R_1}{\underset{|}{C}}AOH$$

wherein $R_1$ is selected from the class consisting of —H and —$CH_3$;
$R_2$ is selected from the class consisting of —H; —$CH_3$; and —$C_6H_5$; and
A is a divalent organic radical selected from the class consisting of $$-CH_2-;\ -\underset{O}{\overset{\parallel}{C}}OCH_2\underset{R_3}{\overset{|}{C}}H-;\ \text{and}\ -CH_2OCH_2\underset{R_3}{\overset{|}{C}}H-;$$

wherein $R_3$ is selected from the class consisting of $$-H;\ -(CH_2)_nCH_3;\ -CH_2Cl;\ -CH_2O\overset{\parallel}{\underset{O}{C}}R_4;\ -CH_2O\overset{\parallel}{\underset{O}{C}}\underset{R_1}{\overset{|}{C}}=CHR_2;$$

$$-CH_2OR_4;\ \text{and}\ -CH_2OCH_2CH=CHR_2$$

wherein $n$ is an integer from zero to ten; and
$R_4$ is selected from the class consisting of phenyl and halogenated phenyl radicals, alkyl and halogenated alkyl radicals having from one to two carbon atoms, benzoxy, phenoxy and halogenated benzoxy and phenoxy radicals.

For each mol of the diisocyanate, two mols of the ethylenically unsaturated alcohol are utilized. The reactants are mixed and heated to a temperature above ambient room temperature, preferably below about 200° C. Usually the exothermic heat of reaction will be sufficient to complete the reaction. Where the reactants are solids, a suitable inert solvent may be employed such as benzene, toluene, xylene. The reactants are maintained at a reaction temperature until substantial completion of the reaction is indicated by a reduction of the —N=C=O content to substantially zero.

The resulting monomer contains two urethane linkages and at least two ethylenically unsaturated carbon-to-carbon linkages:

$$2\ R_2CH=\overset{R_1}{\underset{|}{C}}AOH + R(N=C=O)_2 \longrightarrow$$

$$\left[R_2CH=\overset{R_1}{\underset{|}{C}}AO\overset{O}{\overset{\parallel}{C}}NH-\right]_2 R$$

wherein R is a divalent organic radical. In the preferred monomers, the ethylenically unsaturated linkages are terminal groups $$-CH=CH_2\ \text{or}\ -\overset{CH_3}{\underset{|}{C}}=CH_2$$

yielding divinyl monomers, i.e., the $R_2$ radical is hydrogen. Where the ethylenically unsaturated alcohol contains two ethylenically unsaturated carbon-to-carbon linkages, the resulting monomer will contain four ethylenically unsaturated linkages.

The present product monomers, by virtue of their plural urethane linkages, possess superior resistance to corrosion when polymerized. The absence of unreacted hydroxyl groups in the present monomers introduces thermal stability into the homopolymers and copolymers.

By virtue of the plural ethylenically unsaturated carbon-to-carbon linkages in the monomers, the present monomers may be readily cured through free radical catalysis.

In the preparation of the present monomers, some vinyl polymerization inhibitor should be incorporated into the reaction mixture to prevent premature polymerization of the monomers. Any of the well-known vinyl-polymerization inhibitors may be employed for this purpose, e.g., hydroquinone, quinone, toluhydroquinone, tert-butyl phenol, and the like.

EXAMPLES

*Example 1.*—One mol allyl alcohol (58.01 g.) and one-half mol toluene diisocyanate (87.0 g.) were mixed and developed a heat of reaction which raised the temperature of the mixture to 80° C. in four minutes. The reaction mixture contained about 100 p.p.m. hydroquinone as a polymerization inhibitor. The reaction mixture was maintained at 80° C. for two hours until the —N=C=O content diminished to zero indicating substantial completion of the reaction. The product had the formula $$CH_2=CHCH_2O\overset{O}{\overset{\parallel}{C}}NH-\underset{CH_3}{\underset{|}{C_6H_3}}-HN\overset{O}{\overset{\parallel}{C}}OCH_2CH=CH_2$$

The product was a white, opaque crystalline solid at 30° C. The melting point range was 72–83° C. The solid was insoluble in hot toluene. Infra-red analysis substantiated the structure.

When the present preparation was repeated in benzene as an inert solvent, the product crystals precipitated from solution at room temperature.

The toluene diisocyanate in this and subsequent examples was a commercial mixture of the 2,4-toluene diisocyanate and 2,6-toluene diisocyanate isomers.

*Example 2.*—Thirty mols toluene diisocyanate (5220 g.) and sixty mols hydroxyethyl methacrylate (7800 g.) were mixed. The heat of reaction raised the temperature of 80° C. in 25 minutes. The temperature thereafter was maintained at 80° C. for eleven hours. The final product had a —N=C=O content of zero indicating substantial completion of reaction. The product was a white, opaque solid having the formula

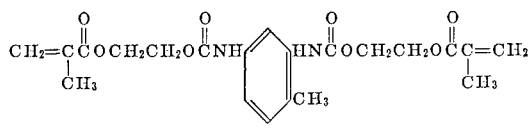

The product had a melting point in the range of 69–71° C.

A mixture of nine parts product with one part styrene was a solid. A mixture of eight parts product with two parts styrene was a semi-solid. A mixture of seven parts product with three parts styrene was thixotropic. A mixture of equal parts product with styrene readily cured with benzoyl peroxide catalyst to a hard, thermoset resinous mass having a Barcol Hardness value of 50–55.

The product monomer when homopolymerized with ditertiary butyl peroxide had a heat distortion point of 180° C.

The starting vinyl alcohol (hydroxyethyl methacrylate) may be formed readily by reaction of methacrylic acid with ethylene oxide.

*Example 3.*—Fifteen mols 2-hydroxypropyl methacrylate (2160 g.) and 7.5 mols toluene diisocyanate (1305 g.) were mixed. The heat of reaction raised the temperature to 75° C. in 18 minutes. The reaction mixture was maintained at 80° C. for six hours until the —N=C=O content was zero indicating substantial completion of reaction. The product was a clear resinous syrup having the formula

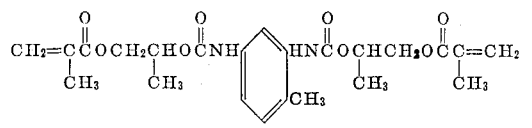

Seven parts by weight of the product monomer were mixed with three parts by weight styrene. The mixture copolymerized with benzoyl peroxide and diethanolamine as a catalyst with a gel time of 11 minutes and a peak exotherm of 165° C. The Barcol Hardness of the cured copolymer was 40–45 after one hour.

The product monomer was homopolymerized with benzoyl peroxide to give a hard, yellow, crystalline homopolymer having a Barcol Hardness of 45–50 after one hour. The heat distortion point of the homopolymer was 145° C.

The starting vinyl alcohol (2-hydroxypropyl methacrylate) may be formed by reaction of methacrylic acid with propylene oxide.

Five parts by weight of the product monomer were mixed with one part by weight of methyl methacrylate. The mixture was stored for seventeen days and thereafter cured with benzoyl peroxide catalyst to yield a copolymer having a Barcol Hardness of 45–50.

Other samples of the product monomer were mixed respectively with 10 percent styrene, 10 percent methyl methacrylate and cured to yield copolymers having Barcol Hardness values of 45–50.

Three parts by weight of the present monomer were mixed with one part by weight of the monomer produced in Example 1 and 0.8 part by weight styrene. That mixture copolymerized readily in the presence of benzoyl peroxide catalyst. The tensile and flexural moduli of the copolymer were greater than those of the homopolymers of the ingredients individually. The copolymer exhibited resistance to acetone, benzene and ten percent solutions of acetic acid, hydrochloric acid and sodium hydroxide.

A further batch of the present monomer was prepared by mixing one mol 2-hydroxypropyl methacrylate (144 g.), one-half mol toluene diisocyanate (78 g.) in 20 percent by weight methyl methacrylate (57.7 g.) as a solvent. The reaction mixture heated to 46° C. and was maintained at 40° C. for ten hours until the —N=C=O content diminished to 0.72 indicating substantial completion of reaction. The product was the present monomer dissolved in twenty percent methyl methacrylate as a copolymerizable solvent. The product solution was a clear syrup. After seventeen days storage, the product mixture was copolymerized with benzoyl peroxide to yield a hardened product having a Barcol Hardness value of 45–50.

*Corrosion properties.*—The present monomer was mixed with twenty percent by weight of styrene and the mixture was copolymerized with benzoyl peroxide. The cured copolymer castings were suspended for seventy-five days in various reagents as follows:

10% sodium hydroxide at 210° F.
Acetone at room temperature
Benzene at room temperature
Concentrated hydrochloric acid at 210° F.

None of the castings exhibited visible decomposition; no film-formation or softening was observed. A similar casting suspended in concentrated acetic acid at 210° F. exhibited only fair resistance to deterioration.

A copolymer was prepared from 75 parts by weight of the present monomer and 25 parts by weight of the monomer of Example 1. The cured castings had a Barcol Hardness value of 50–55. The castings were suspended for seventy-five days in the following reagents:

10% sodium hydroxide at 210° F.
Acetone at room temperature
Benzene at room temperature None of the casting exhibited any deterioration.

A copolymer was prepared from 75 parts by weight of the present monomer and 25 parts by weight of the reaction product of methacrylic acid and an epoxy resin of Bisphenol-A, the said reaction product having the following formula

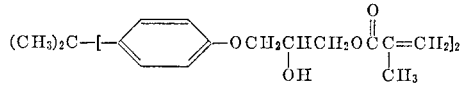

A copolymer was formed from the mixture by addition of benzoyl peroxide catalyst. The copolymer had a Barcol Hardness value of 45–50. The copolymer exhibited fair resistance to sodium hydroxide and good resistance to benzene.

*Example 4.*—One-half mol toluene diisocyanate (87 g.) and one mol 2-hydroxybutyl acrylate (144 g.) were mixed. The exothermic heat of reaction raised the temperature to 75° C. in six minutes. The reaction mixture was maintained at 60° C. for 19 minutes and then diluted with 104 g. styrene.

The styrene solution of the product monomer cured readily with benzoyl peroxide to form a copolymer having a Barcol Hardness value of 35–40.

The product had the formula

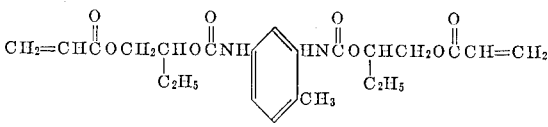

The monomer appeared as a red-brown resinous syrup, exhibited a shelf life in excess of four months at room temperature.

The monomer, diluted with 30 percent methyl methacrylate, readily cured in the presence of benzoyl peroxide to form a copolymer having a Barcol Hardness of 42.

The starting vinyl alcohol may be formed by reaction of acrylic acid with butylene oxide.

*Example 5.*—One-quarter mol toluene diisocyanate (43.5 g.) was mixed with one-half mol 1-methacryloxy dodecanol-2 (157 g.). The exotherm raised the temperature to 98° C. The —N=C=O content diminished to zero after several hours heating at 80° C. The product had the formula

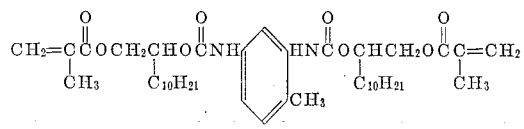

The monomer readily homopolymerized in the presence of benzoyl peroxide. The starting vinyl alcohol may be formed by reaction of methacrylic acid with dodecene oxide -1,2.

*Example 6.*—One mol of 3-chloro-2-hydroxypropyl acrylate (167.5 g.) was heated in a kettle to 65° C. One-half mol toluene diisocyanate (87 g.) was added slowly dropwise to the kettle. The heat of reaction raised the temperature to 83° C. in fifteen minutes. The reaction mixture was maintained at 67° C. for five minutes and then diluted with 102 g. styrene. The styrene solution of the monomer cured to a clear casting upon addition of benzoyl peroxide as catalyst. The copolymer casting had a Barcol Hardness value of 41–44.

The monomer had the formula

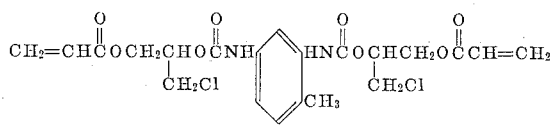

The starting vinyl alcohol may be formed by reaction of acrylic acid with epichlorohydrin.

The foregoing Examples 1–6 illustrate divinyl diurethane monomers of this invention. The following Examples 7–13 illustrate monomers having two urethane linkages and four ethylenically unsaturated carbon-to-carbon linkages. In Examples 7–13 the diisocyanate is toluene diisocyanate. The ethylenically unsaturated alcohol in Examples 7–11 is a reaction product of glycidyl acrylate or methacrylate with an acrylic-type acid. The ethylenically unsaturated alcohol of Examples 12–13 is a reaction product of allyl glycidyl ether with an acrylic-type acid.

*Example 7.*—A monomer according to this invention was prepared by reacting one-half mole toluene diisocyanate (87 g.) and one mol 3-acryloxy-2-hydroxypropyl methacrylate (214 g.). The product had the formula

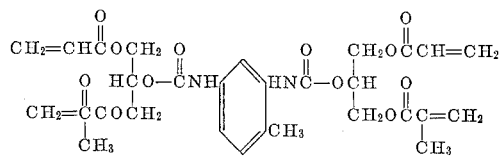

The starting divinyl alcohol may be prepared by reaction of glycidyl acrylate with methacrylic acid or by reaction of glycidyl methacrylate with acrylic acid.

*Example 8.*—One-quarter mol toluene diisocyanate (43.5 g.) and one-half mol 3-methacryloxy-2-hydroxypropyl methacrylate (114 g.) were mixed and the exothermic heat of reaction raised the temperature to 46° C. in eight minutes. The mixture was allowed to cool to 40° C. in 22 minutes. The reaction mixture included 400 p.p.m. (0.0456 g.) p-quinone as polymerization inhibitor.

The monomer had the following formula

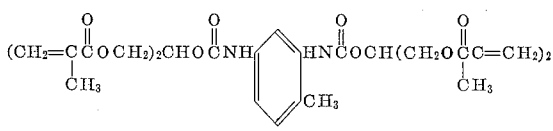

Homopolymers of the product had a Barcol Hardness value of 58–62 and a heat distortion point of 240° C.

The monomer was mixed with 30 percent sytrene. That mixture was a semi-solid paste at room temperature. The copolymer cured with tert-butyl hydroperoxide to develop a Barcol Hardness value of 45–50 and a heat distortion point of 211° C.

The monomer, when mixed with 45 percent by weight of styrene, had a jelly-like consistency.

A copolymerizable mixture of the monomer with an equal weight of 3-methacryloxy-2-hydroxypropyl methacrylate readily cured with a gel time of 6 minutes and a cure time of 16.5 minutes. The peak exotherm was 200° C.

In the generalized formula, this monomer had the following values:

$R_1$ is —$CH_3$; $R_2$ is —H; A is —$\overset{O}{\overset{\|}{C}}OCH_2\overset{}{\underset{R_3}{C}}H$—; $R_3$ is —$CH_2O\overset{O}{\overset{\|}{C}}\underset{CH_3}{C}=CH_2$

*Example 9.*—One-quarter mol toluene diisocyanate (43.5 g.) and one-half mol 3-crotonoxy-2-hydroxypropyl acrylate (107 g.) were mixed. The reactants developed an exotherm and formed the following product

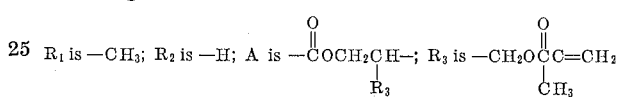

A copolymerizable solution of the monomer in 30 percent by weight styrene was readily cured with benzoyl peroxide to form a copolymer having a Barcol Hardness value of 20–25.

*Example 10.*—One-quarter mol toluene diisocyanate (43.5 g.) was mixed with one-half mol 3-acryloxy-2-hydroxypropyl acrylate (100 g.). After exotherm and heating, the —N═C═O content diminished to 0.75 indicating completion of the reaction. The product monomer had the formula

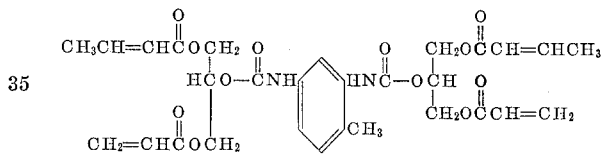

*Example 11.*—One-quarter mol toluene diisocyanate (43.5 g.) was reacted with one-half mol 3-acryloxy-2-hydroxypropyl cinnamate (138 g.). The product monomer had the formula

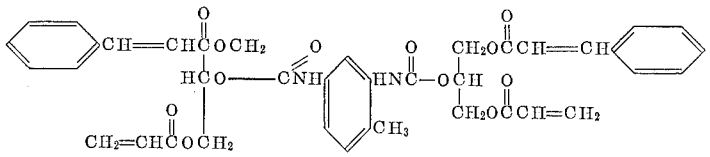

The product monomer was blended with 30 percent by weight styrene. The mixture cured readily to produce a copolymer having a Barcol Hardness of 30–35.

*Example 12.*—A monomer according to this invention was prepared by reacting one-half mol toluene diisocyanate (87 g.) with one mol 3-allyloxy-2-hydroxypropyl methacrylate (136 g.). After three hours heating at 80° C., the —N=C=O content was zero. The monomer had the formula

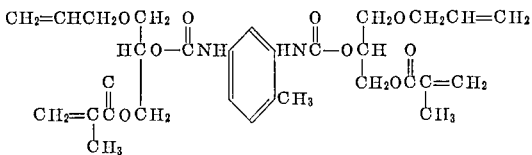

The monomer did not cure in the presence of benzoyl peroxide. The monomer did cure with cumene hydroperoxide and cobalt naphthenate. The homopolymer developed a Barcol Hardness value in the range of 0–15.

*Example 13.*—A monomer according to this invention was prepared by reacting one-half mol toluene diisocyanate (87 g.) and one mol 3-allyloxy-2-hydroxypropyl acrylate (172 g.) After three hours heating at about 80° C., the —N=C=O content was zero. The product had the formula

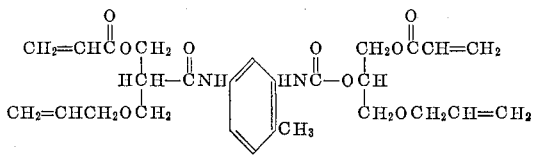

The product monomer was blended with 30 percent by weight of styrene. The styrene solution cured with 1 percent cumene hydroperoxide and one-half percent cobalt naphthenate to yield a copolymer having a Barcol Hardness of 10–15.

In the foregoing Examples 1–13 the diisocyanate has been toluene diisocyanate. The following Example 14 illustrates the present invention with a different diisocyanate, namely, 3,3′-bitolylene-4,4′-diisocyanate.

*Example 14.*—One-half mol 3,3′-bittolylene-4,4′-diisocyanate (133 g.) was mixed with one mol hydroxyethyl methacrylate (130 g.). The reactants developed an exotherm and formed a pasty-solid product having the formula

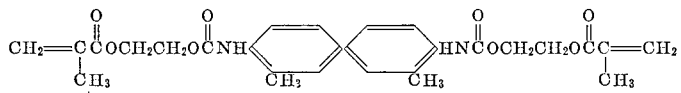

All of the foregoing Examples 1–14 have illustrated diurethane monomers according to this invention. The following Examples 15–41 illustrate tetraurethane monomers according to this invention which utilize as the diisocyanate reactant a diurethane diisocyanate which is formed by reaction of toluene diisocyanate with a dihydric organic compound. In Examples 15–36, the dihydric organic compound is a glycol. In Examples 37–39, the dihydric compound is a bisphenol. In Examples 40–41, the dihydric compound is a dihydric phenolic compound.

Examples 15–20 illustrate the present monomers resulting from reaction of hydroxyethyl methacrylate with a diisocyanate formed by reaction of toluene diisocyanate with a glycol.

*Example 15.*—One-half mol ethylene glycol (31 g.) was mixed with one mol toluene diisocyanate (174 g.) and allowed to react to form the diurethane diisocyanate.

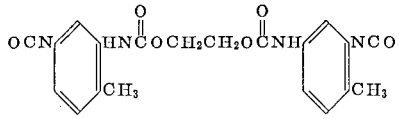

To the product was added one mol hydroxyethyl methacrylate (130 g.). The resulting product had the formula

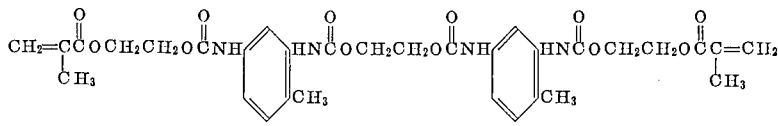

The product monomer was mixed with 30 percent by weight styrene. The mixture readily copolymerized with benzoyl peroxide to form a copolymer having a Barcol Hardness value of 35–40.

*Example 16.*—One mol toluene diisocyanate (174 g.) was reacted with one-half mol diethylene glycol (53 g.) to form a diurethane diisocyanate. One mol hydroxyethyl methacrylate (130 g.) was added to the product to produce a monomer having the formula

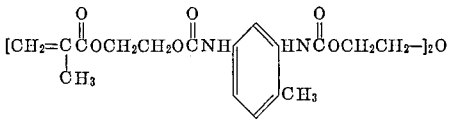

The product monomer was diluted with 30 percent styrene and the mixture cured readily to form a copolymer having a Barcol Hardness value of 35–40.

*Example 17.*—One mol toluene diisocyanate (174 g.) was reacted with one-half mol 1,3-butylene glycol (45.05 g.) to form a diurethane diisocyanate. One mol hydroxyethyl methacrylate was added to the resulting diisocyanate and the mixture heated until the —N=C=O content reached zero. The resultant monomer had the following formula

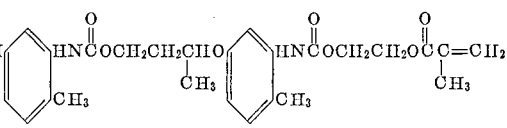

The product monomer was diluted with 30 percent styrene. The mixture cured readily to form a copolymer having a Barcol Hardness value of 30–35.

*Example 18.*—One mol toluene diisocyanate (174 g.), one-half mol 1,4-butene-2-diol (44 g.) and one mol hydroxyethyl methacrylate (130 g.) were combined as described to form a monomer having the formula

The monomer yielded a clear yellow homopolymer when cured with benzoyl peroxide having a Barcol Hardness of 35–40.

*Example 19.*—A monomer according to this invention was prepared by reacting one mol toluene diisocyanate (174 g.), one-half mol, 2,3-butylene glycol (45.05 g.) and one mol hydroxyethyl methacrylate (130 g.) The —N=C=O content diminished to zero after 7.5 hours heating at about 80° C. The product monomer had the formula

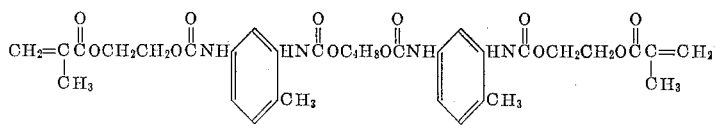

*Example 20.*—A monomer was prepared by reacting one mol toluene diisocyanate (174 g.), one-half mol 1,4-butane-diol (45 g.) and one mol hydroxyethyl methacrylate (130 g.). The —N=C=O content was reduced to zero after heating the reactants for seven hours at about 80° C. The product monomer had the formula

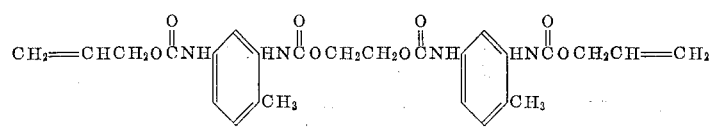

The following Examples 21–23 illustrate monomers of this invention utilizing as a diisocyanate reactant the diurethane reaction product of ethylene glycol and toluene diisocyanate, similar to that of Example 15.

*Example 21.*—Two mols toluene diisocyanate (348 g.) and one mol ethylene glycol (62 g.) were mixed in 600 ml. benzene as a solvent. The heat of reaction raised the temperature to 89° C. in 31 minutes. The reaction mixture was allowed to cool to 35° C. in 104 minutes. The product was a white, powdery solid recovered by evaporating the benzene solvent. That diisocyanate was reacted with allyl alcohol. One-half mol of the diisocyanate (205 g.) was mixed with one mol allyl alcohol (58 g.) in 600 ml. benzene as solvent. The mixture was heated to 56° C. and allowed to cool to 29° C. in 84 minutes. The benzene solvent was removed by evaporation. The product was a white powdery solid having a melting point range of 112–114° C. and a formula

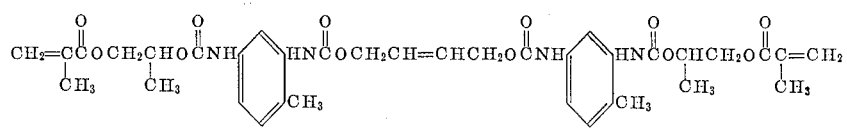

*Example 22.*—One mol hydroxybutyl acrylate (144 g.) was mixed with one-half mol of the reaction product of toluene diisocyanate and ethylene glycol described in Example 21 (205 g.). The product had the formula

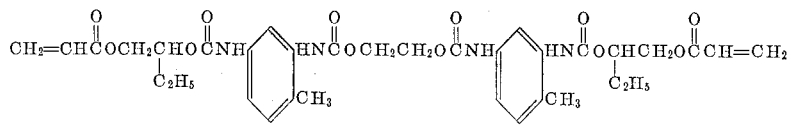

The product monomer was dissolved in benzene. Upon addition of benzoyl peroxide to the benzene solution, clear, hard coatings were prepared by spraying the benzene solution on steel plates.

*Example 23.*—A monomer was prepared by reacting two mols hydroxyethyl acrylate (200 g.) with one mol of the reaction product of ethylene glycol and toluene diisocyanate described in Example 21 (205 g.). The reaction was carried out in 600 ml. benzene as solvent at a temperature of 71° C. The product monomer had the formula

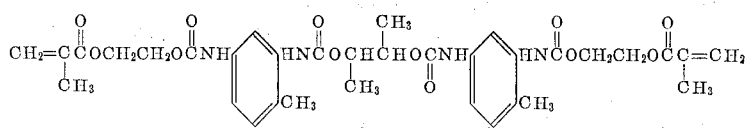

The following Examples 24–36 illustrate the present tetraurethane monomers formed by reacting 2-hydroxypropyl methacrylate with the reaction product of toluene diisocyanate and various glycols.

*Example 24.*—A diurethane diisocyanate was prepared by reacting toluene diisocyanate with 2-butene-1,4-diol. One-half mol of that product (218.5 g.) was reacted with one mol 2-hydroxypropyl methacrylate (144 g.) at 51° C. for 22 minutes. The —N=C=O content diminished to zero. The monomer had the formula

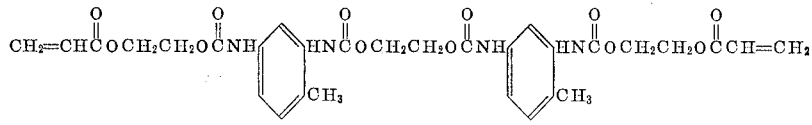

The pale yellow product crystallized at room temperature. The product cured with benzoyl peroxide as catalyst to yield a clear, glassy homopolymer having a Barcol Hardness of 5–10.

The monomer was diluted with 30 percent styrene and the mixture copolymerized to a clear, glassy copolymer having a Barcol Hardness value of 35–40.

*Example 25.*—A diisocyanate diurethane was prepared by reacting toluene diisocyanate and diethylene glycol as described in Example 16. One mol of that diisocyanate (454 g.) was reacted with two mols 2-hydroxypropyl methacrylate (288 g.) at 70° C. for 80 minutes. The product monomer had the formula

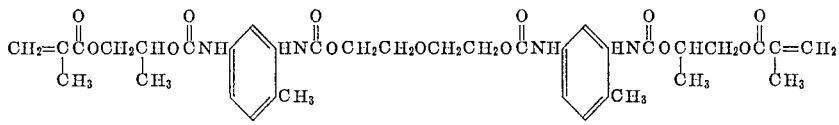

The product was a white, waxy, semi-solid material which homopolymerized readily with benzoyl peroxide catalyst to yield a homopolymer having a Barcol Hardness value of 35–40. Heat distortion point of the homopolymer was 151° C.

*Example 26.*—One-half mol propylene glycol (38 g.) was placed in a flask at room temperature. One mol toluene diisocyanate (174 g.) was added dropwise as the mixture developed an exotherm. Thereafter one mol 2-hydroxypropyl methacrylate (144 g.) was added and the mixture was maintained at 100° C. until the —N=C=O content diminished to zero. The product monomer had the formula

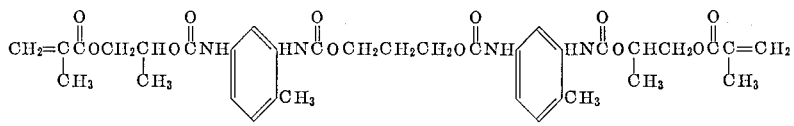

The product was a solid. When diluted with 30 percent styrene, the monomer readily formed a copolymer in the presence of benzoyl peroxide. The copolymer had a Barcol Hardness value of 30–35 in fifteen minutes. The heat distortion point of a homopolymer of the product was 154.5° C.

*Example 27.*—One mol toluene diisocyanate (174 g.), one-half mol 1,3-butylene glycol (45.05 g.) and one mol 2-hydroxypropyl methacrylate (144 g.) were reacted as described to form a monomer having the formula

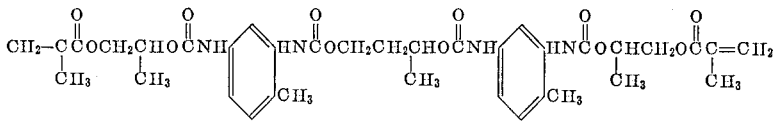

The homopolymer of the product was clear and glassy. The monomer was mixed with 30 percent styrene. The mixture cured with benzoyl peroxide to form a clear, glassy copolymer having a Barcol Hardness of 30–35.

*Example 28.*—One mol toluene diisocyanate (174 g.) and one-half mol 2,3-butylene glycol (45.05 g.) reacted to form a diurethane diisocyanate which in turn was reacted with one mol 2-hydroxypropyl methacrylate (144 g.) to form a monomer having the formula

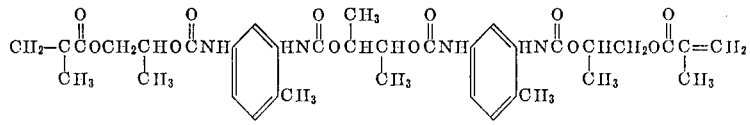

The monomer readily homopolymerized in the presence of benzoyl peroxide to form a homopolymer having a Barcol Hardness value of 30–32.

*Example 29.*—One mol toluene diisocyanate (174 g.), one-half mol 1,5-pentane-diol (52 g.) and one mol 2-hydroxypropyl methacrylate (144 g.) were reacted to form a monomer having the formula

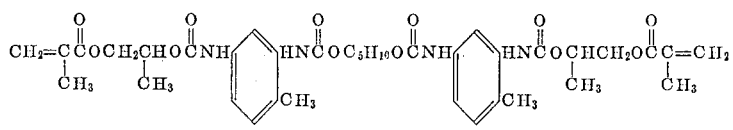

The product monomer readily homopolymerized to yield a homopolymer having a Barcol Hardness value of 25–30.

*Example 30.*—A monomer was prepared by reacting one mol toluene diisocyanate (174 g.), one-half mol dipropylene glycol (67 g.) and one mol 2-hydroxypropyl methacrylate (144 g.). After heating for nearly three hours at about 80° C., the —N=C=O content was diminished to zero. The resulting monomer had the formula

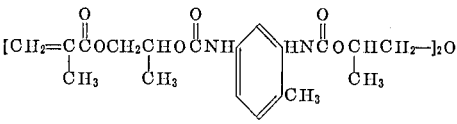

*Example 31.*—A monomer was prepared by reacting one mol toluene diisocyanate (174 g.), one-half mol polyethylene glycol 200 (100 g.) and one mol 2-hydroxypropyl methacrylate (144 g.).Polyethylene glycol has the following formula

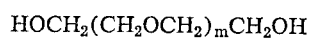

HOCH$_2$(CH$_2$OCH$_2$)$_m$CH$_2$OH wherein $m$ is an integer from 3 to 165. Polyethylene glycol 200 has an average molecular weight of 200.

The product monomer obtained in this example had the formula

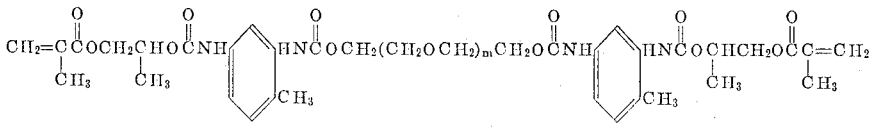

wherein $m$ is an integer from 3 to 165.

Example 32.—A monomer was prepared by reacting one mol toluene diisocyanate (174 g.), one-half mol neopentyl glycol (52 g.) and one mol 2-hydroxypropyl methacrylate (144 g.). The materials were reacted in a solution of 158.5 g. styrene. The —N=C=O content was zero after 3.5 hours heating at 80° C. The product monomer had the formula

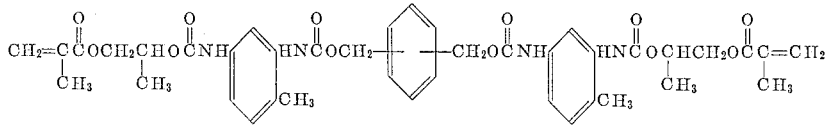

The solution of the product monomer in styrene had a Brookfield viscosity of 28,300 cps. The styrene solution readily copolymerized to a thermoset mass having a Barcol Hardness value of 30–35.

Example 33.—A monomer was prepared by reacting one mol toluene diisocyanate (174 g.), one-half mol 3-methyl-1,5-pentane diol (59 g.) and one mol 2-hydroxypropyl methacrylate (144 g.). The product monomer had the formula

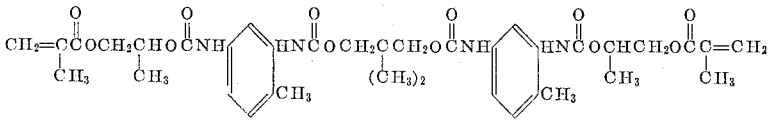

Example 34.—A monomer was prepared by reacting one mol toluene diisocyanate (174 g.), one-half mol 2-ethoxymethyl-2,4-dimethylpentane diol (95 g.) and one mol 2-hydroxypropyl methacrylate. The monomer had the formula

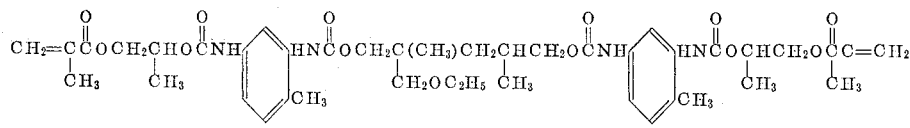

The monomer readily formed a homopolymer with benzoyl peroxide having a Barcol Hardness value of 20–25.

Example 35.—A monomer was prepared by reacting one mol xylylene glycol (138 g.) with two mols toluene diisocyanate (348 g.) in 600 ml. benzene as solvent. The xylylene glycol was added dropwise to the toluene diisocyanate solution. The mixture was maintained at 64° C. for 95 minutes. The product was a white powder having a —N=C=O content of 16.56. Theoretical —N=C=O content is 17.32. The resulting diisocyanate reacted readily with various vinyl alcohols according to this invention.

One mol of the described diisocyanate (293 g.) was mixed with two mols 2-hydroxymethyl methacrylate (288 g.) and heated at 70° C. until the —N=C=O content diminished to less than 4. The product monomer had the formula

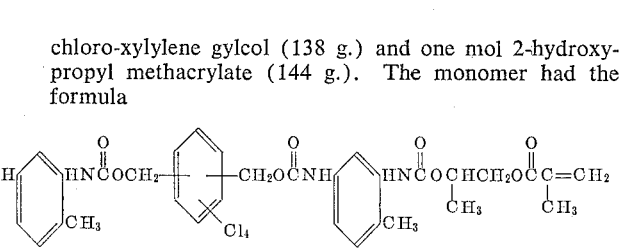

A homopolymer of the product developed a Barcol Hardness value of 30–35 in fifteen minutes.

Example 36.—A monomer was prepared by reacting one mol toluene diisocyanate (174 g.), one-half mol tetra-chloro-xylylene gylcol (138 g.) and one mol 2-hydroxypropyl methacrylate (144 g.). The monomer had the formula

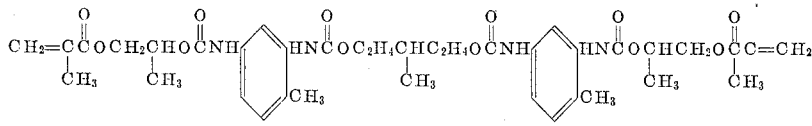

The product monomer had a melting point range of 176–191° C. The product solidified after setting for 72 hours at room temperature.

In the following Examples 37–39 are illustrated monomers of this invention which utilize as a diisocyanate reactant a product of the reaction between an organic diisocyanate and a bisphenol.

Example 37.—One mol toluene diisocyanate (174 g.) was mixed with one-half mol Bisphenol-A (114 g.) in 473 ml. benzene as solvent. The mixture included 0.5 ml. hydrochloric acid. There was no apparent exotherm. The mixture was heated to 80° C. for about two hours. White powder precipitated from the benzene solution. On cooling overnight, the reaction was completed.

Thereafter one mol 2-hydroxyethyl methacrylate (130 g.) was added to the benzene solution at room temperature. The mixture developed an exotherm which raised the temperature to 50° C. The mixture was maintained at 70° C. for 75 minutes until the —N=C=O content diminished to zero. The product monomer had the formula

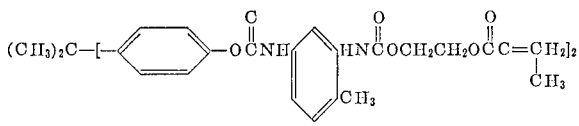

*Example 38.*—One half mol Bisphenol-A (114 g.) and one mol toluene diisocyanate (174 g.) were reacted as described in Example 37. Thereafter one mol 2-hydroxypropyl methacrylate (144 g.) was added and the mixture heated until the —N=C=O content was zero. The product had the formula

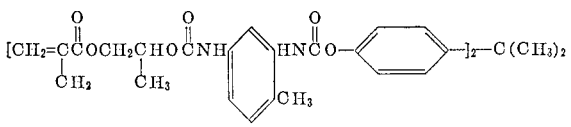

The product monomer cured in the presence of benzoyl peroxide to form a clear, rubbery homopolymer.

*Example 39.*—A diisocyanate was prepared by reacting one-half mol hydrogenated Bisphenol-A (120 g.) with one mol toluene diisocyanate (174 g.) in 473 ml. benzene as solvent. The ingredients were maintained at 80° C. for five hours. Thereupon one mol hydroxyethyl methacrylate (130 g.) was added and the mixture was maintained at 80° C. for an additional two hours. The final —N=C=O content was zero. The clear resinous benzene solution was evaporated to produce a white, opaque solid having the formula

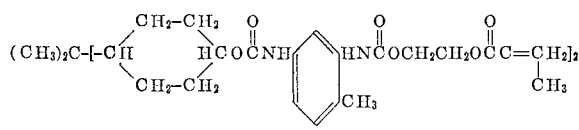

The product readily homopolymerized with benzoyl peroxide catalyst to yield a homopolymer having a Barcol Hardness of 10–15.

The following Examples 40–41 illustrate the tetraurethane monomers of this invention utilizing as a diisocyanate reactant a product of the reaction between an organic diisocyanate and a dihydric phenol.

*Example 40.*—A monomer was prepared by reacting one mol toluene diisocyanate (174 g.), one-half mol resorcinol (54 g.) and one mol 2-hydroxypropyl methacrylate (144 g.). The reactants were dissolved in 30 parts by weight styrene (159.4 g.) as a reaction solvent. The product monomer had the formula

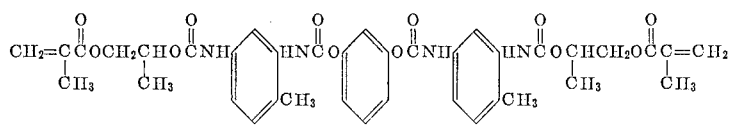

The product monomer had a glassy, hard crystalline appearance.

*Example 41.*—A monomer was prepared by reacting one mol toluene diisocyanate (174 g.), one-half mol 2,3-naphthalene diol (78 g.) and one mol 2-hydroxypropyl methacrylate (144 g.). After the —N=C=O content reached zero, the monomer had the formula

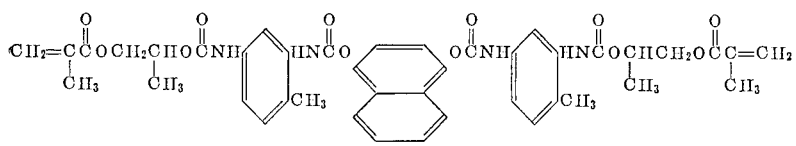

THE DIISOCYANATE

The diisocyanate reactant of this invention may be any organic compound having the general formula $$O=C=N-R-N=C=O$$

wherein R is a divalent organic radical. Toluene diisocyanate is a readily available diisocyanate in commerce. Other normally available diisocyanates which might be employed include:

1,5-naphthalene diisocyanate
cumene-2,4-diisocyanate
4-methoxy-1,3-phenylene diisocyanate
4-chloro-1,3-phenylene diisocyanate
4-bromo-1,3-phenylene diisocyanate
4-ethoxy-1,3-phenylene diisocyanate
2,4'-diisocyanato diphenyl ether
5,6-dimethyl-1,3-phenylene diisocyanate
2,4-dimethyl-1,3-phenylene diisocyanate
4,4'-diisocyanato diphenyl ether
benzidine diisocyanate
4,6-dimethyl-1,3-phenylene diisocyanate
9,10-anthracene diisocyanate
4,4'-diisocyanato dibenzyl
3,3'-dimethyl-4,4'-diisocyanato diphenyl
2,4-diisocyanatostilbene
3,3'-dimethyl-4,4'-diisocyanato phenyl methane
3,3'-dimethoxy-4,4'-diisocyanato diphenyl
1,4-anthracene diisocyanate
2,5-fluorene diisocyanate
1,8-naphthalene diisocyanate
2,6-diisocyanato benzfuran
amyl benzene-2,4-diisocyanate
hexyl benzene-2,4-diisocyanate
dodecyl benzene-2,4-diisocyanate
butyl benzene-2,4-diisocyanate
polymethylene diisocyanates, such as tetramethylene diisocyanate pentamethylene diisocyanate hexamethylene diisocyanate
cycloalkylene diisocyanates, such as cyclohexylene-1,4-diisocyanate
hetero chain diisocyanates, such as (O=C=NCH$_2$CH$_2$)$_2$O Alternatively the present diisocyanates may be prepared by the reaction of any of the above-diisocyanates or others with a glycol wherein two mols of the diisocyanate are reacted with one mol of a glycol, as, for example, the diisocyanate formed from reacting toluene diisocyanate with a glycol such as:

Ethylene glycol (Examples 15, 21, 22, 23); diethylene glycol (Examples 16, 25); triethylene glycol; polyethylene glycols (Example 31); propylene glycol (Example 26); dipropylene glycol (Example 30); hexylene glycol; 1,5-pentane diol (Example 29); 2-ethyl-1,3-hexane diol; 2,2-dimethyl-1,3-butane diol; 2-butene-1,4-diol (Examples 18, 24); 1,3-butylene glycol (Examples 17, 27); 1,4-butane glycol (Example 20); 2,3-butylene glycol (Examples 19, 28); 2-ethoxymethyl-2,4-dimethylpentane diol (Example 34); 3-methyl-1,5-pentane diol (Example 33); neopentyl glycol (Example 32); xylylene glycol (Example 35); tetrachloroxylylene glycol (Example 36); and the like.

Likewise the diisocyanates may be formed by reacting any available diisocyanate with a dihydric phenol including monocyclic phenols, polycyclic phenols, polynuclear phenols, such as resorcinol (Example 40), catechol, bisphenols (Examples 37, 38, 39); naphthalene diols (Example 41); and the like.

In general the diisocyanate compound is a monomer containing two —N=C=O groups separated by a divalent organic radical.

ETHYLENICALLY UNSATURATED ALCOHOLS

The ethylenically unsaturated alcohol of this invention has the generalized formula

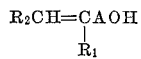

wherein $R_1$ is selected from the class consisting of —H and —$CH_3$; $R_2$ is selected from the class consisting of —H; —$CH_3$ and —$C_6H_5$;

A is a divalent organic radical selected from the class consisting of

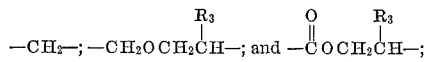

wherein $R_3$ is selected from the class consisting of

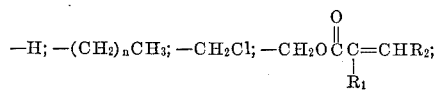

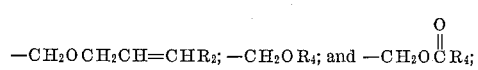

wherein $n$ is an integer from zero to ten; and $R_4$ is selected from the class consisting of phenyl and halogenated phenyl radicals, alkyl and halogenated alkyl radicals having from one to two carbon atoms, benzoxy, phenoxy and halogenated benzoxy and phenoxy radicals.

In the generalized formula, where $R_2$ is hydrogen, the resulting compound of this invention is a divinyl monomer. Where $R_2$ is —$CH_3$, the resulting compound is a dicrotyl monomer.

Where A is —$CH_2$—, the resulting compound is either dicrotyl or dicinnamyl monomer.

Where A is

the starting ethylenically unsaturated alcohol may be prepared by reaction of an unsaturated acid (acrylic, methacrylic, cinnamic, crotonic) with ethylene oxide (Examples 2, 14 through 20, 23, 35, 37, 39); propylene oxide (Examples 3, 24, 26 through 34, 38, 40, 41); butylene oxide (Examples 4, 22); octalene oxide; dodecene oxide (Example 5); or epichlorohydrin (Example 6). Alternatively the starting alcohol may be formed by reaction of glycidyl acrylate, glycidyl methacrylate, glycidyl cinnamate, glycidyl crotonate with acrylic acid (Example 10); methacrylic acid (Examples 7, 8); crotonic acid (Example 9); cinnamic acid (Example 11); acetic acid, propionic acid, benzoic acid, phenol, halogenated acetic acid, halogenated propionic acid, halogenated phenols and the like.

Where A is

the starting ethylenically unsaturated alcohol may be formed by reaction of allyl alcohol, crotyl alcohol, cinnamyl alcohol with ethylene oxide, propylene oxide, butylene oxide, octalene oxide, dodecene oxide or epichlorohydrin. Alternatively the starting ethylenically unsaturated alcohol may be formed by reaction of allyl glycidyl ether, crotyl glycidyl ether, cinnamyl glycidyl ether with acrylic acid (Example 13); methacrylic acid (Example 12); crotonic acid, cinnamic acid, acetic acid, chlorinated acetic acid, propionic acid, benzoic acid, phenol and the like.

The starting ethylenically unsaturated alcohols normally are inhibited in storage against vinyl polymerization by means of conventional polymerization inhibitors such as hydroquinone, quinone, tert-butyl catechol, toluhydroquinone and the like. Usually the inherent amount of the polymerization inhibitor will be sufficient to prevent polymerization from occurring during the monomer-formation reactions of this invention. Where indicated, additional polymerization inhibitor may be utilized during the monomer-formation reactions and in the resultant product monomer for storage purposes.

A partial listing of ethylenically unsaturated alcohols which have been found suitable in the present diurethane monomers includes:

2-hydroxyethyl acrylate
2-hydroxypropyl acrylate
2-hydroxybutyl acrylate
2-hydroxyoctyl acrylate
2-hydroxydodecanyl acrylate
2-hydroxy-3-chloropropyl acrylate
2-hydroxy-3-acryloxypropyl acrylate
2-hydroxy-3-methacryloxypropyl acrylate
2-hydroxy-3-allyloxypropyl acrylate
2-hydroxy-3-cinnamylpropyl acrylate
2-hydroxy-3-phenoxypropyl acrylate
2-hydroxy-3-(o-chlorophenoxy)propyl acrylate
2-hydroxy-3-(p-chlorophenoxy)propyl acrylate
2-hydroxy-3-(2,4-dichlorophenoxy)propyl acrylate
2-hydroxy-3-acetoxypropyl acrylate
2-hydroxy-3-propionoxypropyl acrylate
2-hydroxy-3-chloroacetoxypropyl acrylate
2-hydroxy-3-dichloroacetoxypropyl acrylate
2-hydroxy-3-trichloroacetoxypropyl acrylate
2-hydroxy-3-benzoxypropyl acrylate
2-hydroxy-3-(o-chlorobenzoxy)propyl acrylate
2-hydroxy-3-(p-chlorobenzoxy)propyl acrylate
2-hydroxy-3-(2,4-dichlorobenzoxy)propyl acrylate
2-hydroxy-3-(3,4-dichlorobenzoxy)propyl acrylate
2-hydroxy-3-(2,4,6-trichlorophenoxy)propyl acrylate
2-hydroxy-3-(2,4,5-trichlorophenoxy)propyl acrylate
2-hydroxy-3-(o-chlorophenoxyacetoxy)propyl acrylate
2-hydroxy-3-phenoxyacetoxypropyl acrylate
2-hydroxy-3-(p-chlorophenoxyacetoxy)propyl acrylate
2-hydroxy-3-(2,4-dichlorophenoxyacetoxy)propyl acrylate
2-hydroxy-3-(2,4,5-trichlorophenoxyacetoxy)propyl acrylate
2-hydroxy-3-crotonoxypropyl acrylate
2-hydroxy-3-cinnamyloxypropyl acrylate In addition to the foregoing enumerated acrylates, it will be apparent that the methacrylates, cinnamates and crotonates are suitable in the present monomer preparations.

Other suitable alcohols include the reaction products of allyl glycidyl ether with allyl, crotyl and cinnamyl alcohols.

MONOMER FORMATION

The present monomers are formed by combining two mols of the ethylenically unsaturated alcohol with one mole of a suitable diisocyanate. Excess alcohol may be utilized to promote the completion of reaction. However we have found that the use of excess alcohol tends to decrease the Barcol Hardness of the homopolymers and copolymers of the product monomers.

The mere mixing of the two reactants presents an exothermic reaction which in many instances generates sufficient heat for the completion of the reaction. The reactants are maintained at an elevated temperature above ambient room temperature until the —N=C=O content of the mixture is reduced to substantially zero indicating substantial completion of the reaction. Excessive temperatures should be avodide to discourage gelation. In general we prefer to conduct the present reaction at temperatures between about 25° C. and 200° C.

Where the starting materials or the product is a solid, it may be desirable to utilize an inert solvent in the reaction mixture. Benzene, toluene and xylene have been found useful for this purpose, especially where the diisocyanate is aromatic.

Where the monomer is to be blended with another copolymerizable monomeric ethylenically unsaturated material for use as a copolymerizable mixture, it may be desirable to utilize the polymerizable monomer as the solvent for the reaction system in which the present monomer is formed. In some instances, styrene and methyl methacrylate have been utilized as the solvent in the reaction system. The solvents are inert with respect to the diisocyanate and will not react with the ethylenically unsaturated alcohol in the absence of a suitable free-radical catalyst, at least so long as a suitable quantity of polymerization inhibitor is present in the system. See Examples 32, 40.

UTILITY

The product monomers possess at least two ethylenically unsaturated carbon-to-carbon linkages which serve as sites for polymerization. The monomers in addition possess at least two urethane linkages which introduce corrosion resistant properties into the homopolymers and copolymers.

The present monomers are homopolymerizable in the presence of suitable initiators such as benzoyl peroxide, cumene hydroperoxide, and the like. Suitable accelerators may be added such as dimethyl aniline.

The present monomers likewise are copolymerizable with ethylenically unsaturated monomers of the prior art such as styrene, vinyl toluene, divinyl benzene, diallyl phthalate, unsaturated polyesters, alkyl acrylates and methacrylates, ethylenically unsaturated silicones and the like.

We claim:

1. A polymerizable divinyl diurethane monomer having the formula

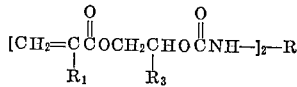

wherein R is a divalent organic radical selected from the class consisting of

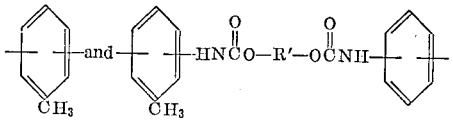

wherein R' is a divalent organic radical selected from the class consisting of alkylene radicals, arylene radicals, polyalkylene ether radicals and alkarylene radicals;

$R_1$ is selected from the class consisting of —H and —CH$_2$;

$R_3$ is selected from the class consisting of

—H; —CH$_2$Cl; —(CH$_2$)$_n$CH$_3$; —CH$_2$OCH$_2$CH$_2$; and

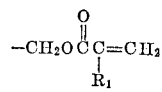

and $n$ is an integer from zero to ten.

2. A polymerizable ethylenically unsaturated tetrauethane monomer having the formula

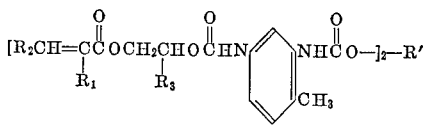

wherein R' is a divalent organic radical selected from the class consisting of alkylene radicals, arylene radicals, polyalkylene ether radicals and alkarylene radicals;

$R_1$ is selected from the class consisting of —H and —CH$_3$;

$R_2$ is selected from the class consisting of —H; —CH$_3$; and —C$_6$H$_5$;

$R_3$ is selected from the class consisting of

—H; —CH$_2$Cl; —(CH$_2$)$_n$CH$_3$

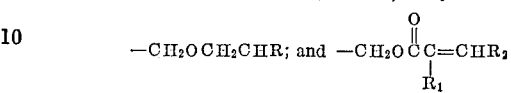

and $n$ is an integer from zero to ten.

3. The ethylenically unsaturated tetraurethane monomer of claim 2 wherein R' is derived from a glycol selected from the class consisting of ethylene glycol
xylylene glycol
diethylene glycol
propylene glycol
polyethylene glycol
dipropylene glycol
1,3-butylene glycol
1,4-butylene glycol
2,3-butylene glycol
2-butene-1,4-diol
1,5-pentane diol
neopentyl glycol
3-methyl-1,5-pentane glycol
2-ethoxymethyl-2,4-dimethylpentane diol and tetrachloroxylylene glycol.

4. The ethylenically unsaturated tetraurethane monomer of claim 2 wherein R' is derived from a dihydric phenol selected from the class consisting of resorcinol
Bisphenol-A
hydrogenated Bisphenol-A
bitolylene and
2,3-naphthalene diol.

5. The ethylenically unsaturated tetraurethane monomer of claim 2 wherein the radical

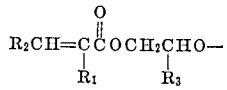

is derived from an ethylenically unsaturated alcohol selected from the class consisting of hydroxyethyl acrylate and methacrylate
2-hydroxypropyl acrylate and methacrylate
2-hydroxybutyl acrylate and methacrylate
2-hydroxydodecanyl acrylate and methacrylate
3-chloro-2-hydroxypropyl acrylate and methacrylate.

6. The tetravinyl tetraurethane monomer of claim 2 wherein the radical

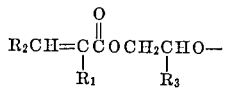

is derived from an ethylenically unsaturated alcohol selected from the class consisting of 3-acryloxy-2-hydroxypropyl acrylate, methacrylate, crotonate and cinnamate;
3-methacryloxy-2-hydroxypropyl methacrylate, crotonate and cinnamate;
3-crotonoxy-2-hydroxypropyl crotonate and cinnamate;

7. The compound

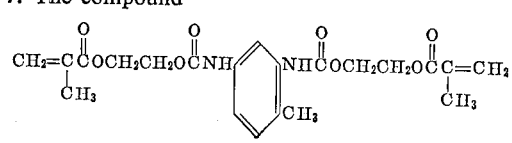

8. The compound

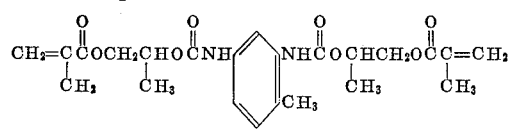

9. The compound

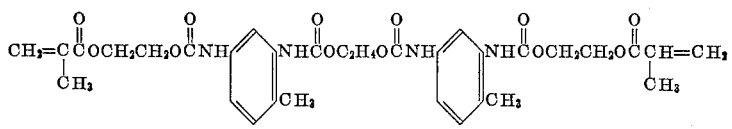

10. The compound

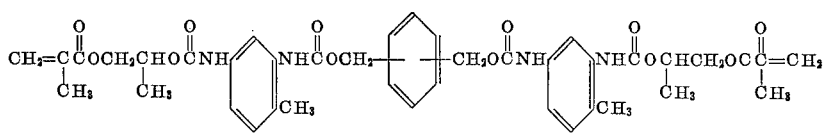

11. The compound

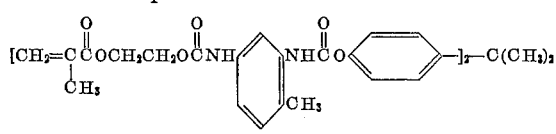

12. The compound

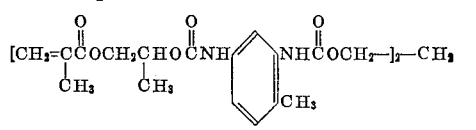

13. The compound

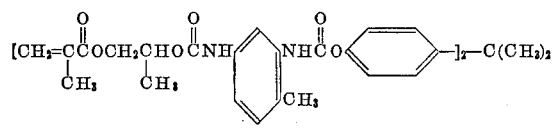

14. The compound

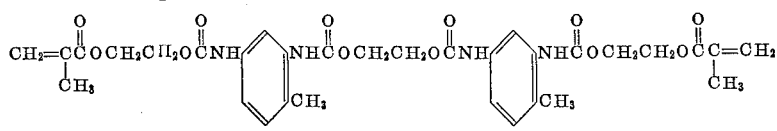

15. The compound

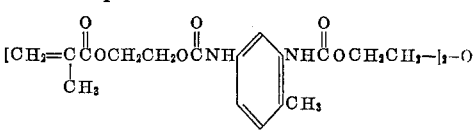

16. The compound

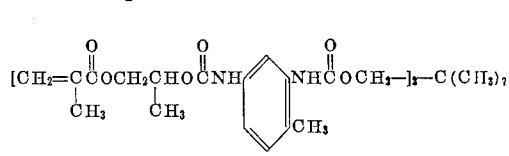

17. The compound

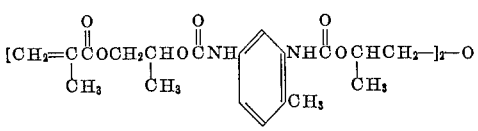

18. The compound

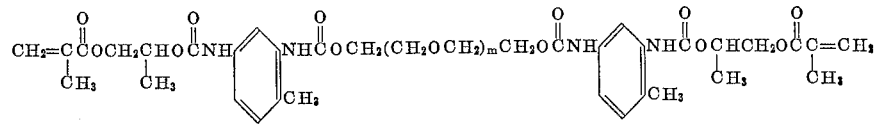

wherein $m$ is an integer from 3 to 165.

References Cited by the Examiner

UNITED STATES PATENTS

| | | | |
|---|---|---|---|
| 2,394,592 | 2/1946 | Chenicek | 260—471 XR |
| 2,395,750 | 2/1946 | Muskat et al. | 260—471 XR |
| 2,556,437 | 6/1951 | Mowry et al. | 260—471 XR |
| 2,695,913 | 11/1954 | Bloch et al. | 260—471 |
| 2,734,911 | 2/1956 | Strain | 260—471 |
| 2,806,051 | 9/1957 | Brockway | 260—471 |
| 2,856,386 | 10/1958 | Smith et al. | 260—77.5 |
| 2,958,704 | 11/1960 | Dinsbergs et al. | 260—471 XR |
| 2,969,386 | 1/1961 | McElroy | 260—471 XR |
| 3,028,367 | 4/1962 | O'Brien | 260—77.5 |

LORRAINE A. WEINBERGER, *Primary Examiner.*

LEON ZITVER, *Examiner.*

M. S. JAROSZ, L. A. THAXTON, *Assistant Examiner.*